Oct. 16, 1934.  B. H. WILLIAMS  1,977,363
CHUCK
Filed Feb. 1, 1933   2 Sheets-Sheet 1
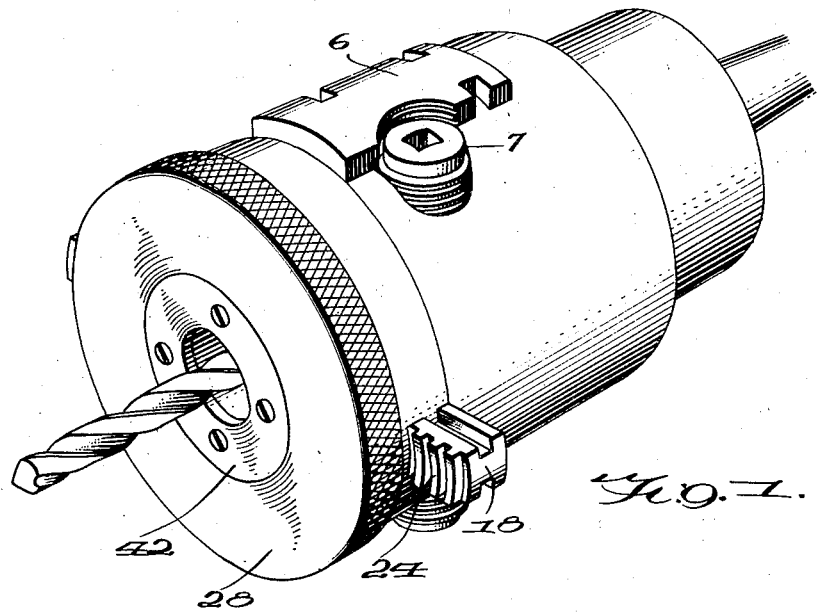
Fig.1.
Fig.2.  Fig.6.  Fig.3.
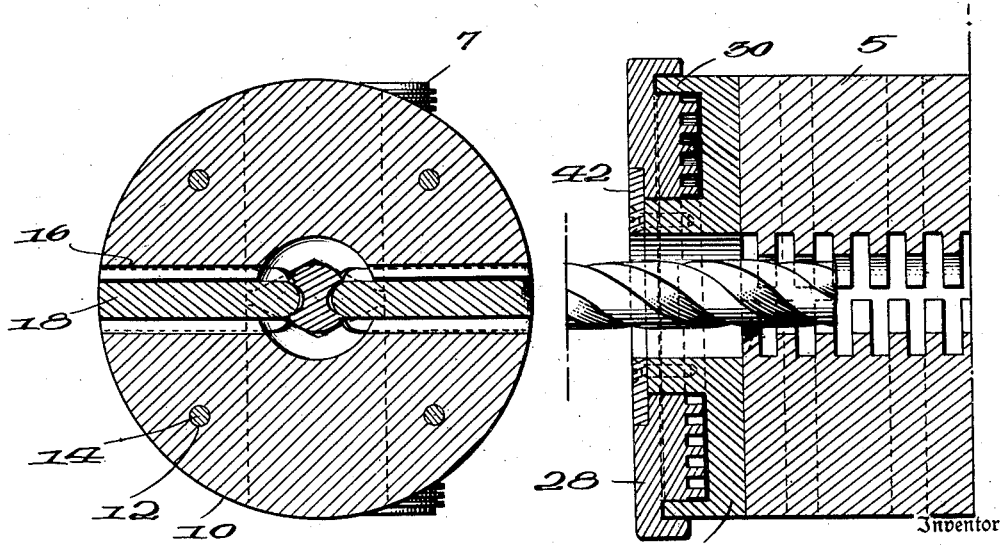
Fig.7.
Inventor
B. H. Williams,
By
Attorney Oct. 16, 1934.    B. H. WILLIAMS    1,977,363
CHUCK
Filed Feb. 1, 1933    2 Sheets-Sheet 2
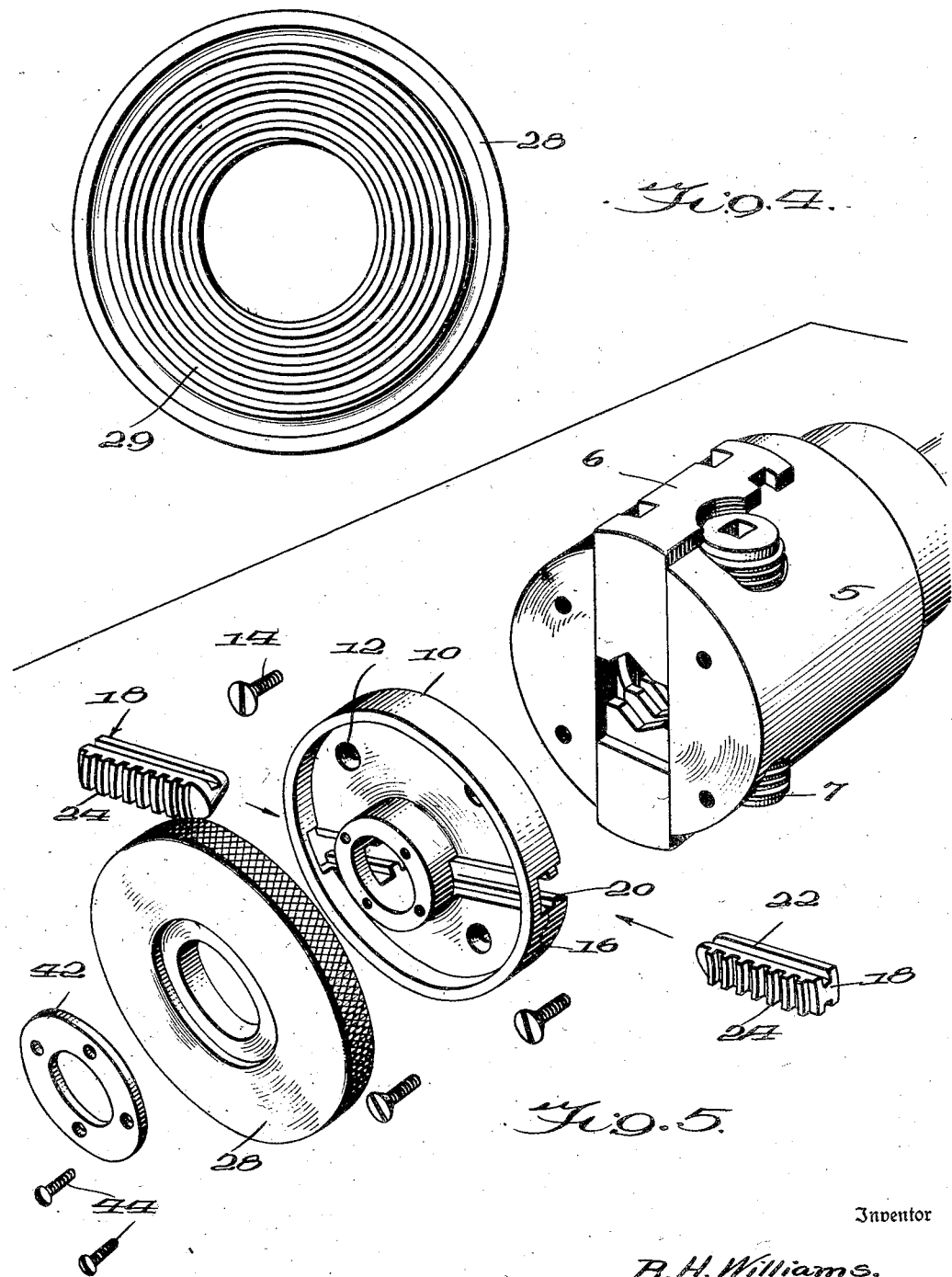

Patented Oct. 16, 1934

1,977,363

UNITED STATES PATENT OFFICE 1,977,363

CHUCK

Blanche H. Williams, Barcroft, Va.

Application February 1, 1933, Serial No. 654,745

1 Claim. (Cl. 279—112)

This invention relates to chucks and more particularly to a means for employing broken drills.

In the conventional chuck no provision is made for using a twist drill after the drill is broken with the result that the drill must be discarded, in many cases representing a substantial financial loss because of the cost of the drill and with an appreciation of this, the invention forming the subject of this application will be found to provide for the use of the drill after being broken and for the accurate centering of the drill even though the shank has been broken and it is necessary to grip the drill at the fluted portion thereof.

Other objects and advantages will be apparent during the course of the following description.

In the accompanying drawings forming a part of this application and in which like numerals are employed to designate like parts throughout the same, Figure 1 is a perspective of a chuck embodying the invention, Figure 2 is a vertical transverse sectional view illustrating the manner in which the broken drill may be connected to a chuck, Figure 3 is a vertical longitudinal sectional view through the broken drill engaging mechanism, Figure 4 is a rear elevation of an adjusting plate embodied in the invention, Figure 5 is a group perspective illustrating the drill engaging means and a chuck, Figure 6 is an end elevation of a jaw embodied in the invention, Figure 7 is a side elevation of the jaw shown in Figure 6, a relatively small drill being shown in dotted lines.

In the drawings, wherein for the purpose of illustration is shown a preferred embodiment of the invention, the numeral 5 generally designates a chuck having what might be said to be conventional diametrically opposite jaws 6 engaged by adjusting devices 7 by which the jaws may be brought into pressure contact with the adjacent portion of a drill.

As shown in Figure 5, the forward end or face of the chuck 5 is flat affording a convenient attaching surface for the carrier 10 of the improved drill engaging device.

More particularly, the carrier 10 is in the form of an annulus having axial openings 12 for the passage of fastening devices 14 of any suitable nature by which the carrier is secured flatly in engagement with the chuck 5.

It is further illustrated in Figure 5 that the carrier is provided with diametrically opposite radial grooves 16 slidably receiving radial jaws 18. The grooves 16 are shown to be provided between the inner and outer radial edges thereof with oppositely located tongues or ribs 20 located in similarly shaped longitudinal grooves 22 in the jaws 18.

In Figure 3 it is illustrated that the jaws 18 are provided on what might be said to be the inner surface thereof, with uniformly spaced transversely extending arcuate teeth 24 received within the spiral groove defined in the opposed side of the front or cover plate 28, the said spiral groove being defined by providing the opposed side of the front plate with a spiral thread 29. Clearly, the turning of the front or adjusting plate 28 provides a simple means for the simultaneous and co-extensive adjustment of the jaws 18 and by reference to Figure 3 it will be seen that the periphery of the adjusting plate 28 is knurled providing a convenient means by which the plate may be manually turned. Also, in Figure 3 it will be seen that the inner surface of the cover or adjusting plate is provided with an annular groove receiving the annular flange 30 at the peripheral portion of attaching plate 10 and in this manner an overlapping and yet rotatable connection is provided between the attaching and cover plates.

Referring now to Figures 3 and 5 it will be seen that the cover or adjusting plate is in the nature of an annulus and that the opening through the center of this plate snugly receives the hub 40 of the attaching plate 10. More particularly, the central opening through the plate 28 is counter-bored to provide a seat for the fastening ring 42 and such ring is secured by fastening devices 44 to the adjacent end of the hub 40.

Thus, the connection between the various parts of the drill gripping device is such that the assembling of the device is simplified and the attachment of the device to an existing chuck is greatly expedited, it being noted in this latter connection that the flat inner surface of the attaching plate 10 makes it a convenient matter to attach the device to a conventional chuck, either during manufacture or at any time thereafter without adding greatly to the cost of the chuck. It will be seen that the attaching plate 10 is divided by the oppositely located radial grooves into a pair of semi-circular sections rigidly joined at the outer circumferential edges thereof by the flange as shown in Figure 5 and rigidly joined at the inner ends or edges by the hub 40, both the hub and the flange being extended axially in the same direction or located at the same side of the attaching plate and providing an effective means by which the two semi-circular sections of the attaching plate are held together.

The jaws 18 are shown to be located at right angles to the jaws 6 and the inner ends of the jaws 18 are shown to be reduced and to be formed with helical leads corresponding to the lead of the flutes in the drills so that the inner ends of such jaws may enter the flutes in the drills to hold the drills accurately centered. Of course, a sufficient portion of the drill is extended into the space between the jaws 6 for engagement by the jaws 6 so that the jaws 6 are enabled to cooperate with the jaws 18 in holding the drill firmly in a centered position for engagement with the work.

The taper of the inner ends of the jaws with helical leads provides for the engagement of drills in a wide variety of sizes, adapting the device for use in connection with the larger and hence much more expensive drills.

It is important to observe that the helical inner ends of the jaws 18 are not fully seated within the flutes of the drill but on the contrary are spaced from the bottom walls of the flutes and are engaged uniformly with the corner or edge portions of the flutes producing spaced contact points between each jaw and the associated flute.

In this manner, the drills are securely engaged in a manner that holds the drill in an accurately centered position. Were the jaws allowed to have engagement with the bottom walls of the flutes as distinguished from the engagement of the jaws with the edge portions of the flutes, the drill would be allowed to rock slightly, attention in this regard being invited to the fact that with the engagement of the jaws 18 with the drill adjacent the peripheral portion of the drill, the drill is securely locked in place.

The taper of the inner ends of the jaws is such that the engagement between the jaws and the flute is provided in a wide range of drill sizes. By engaging the inner portions of the jaws 18 with the outer corners of the flutes, there is established a four-point contact between the drill and the jaws and such four points of contact are located at the periphery of the drill with the result that the drill is accurately centered and is firmly held in place. So far as I am aware I am the first to provide a four-point contact between the jaws and a drill with such contact located at the periphery of the drill.

It is to be understood that the form of invention herewith shown and described is to be taken merely as a preferred example of the same and that such minor changes in arrangement and construction of parts may be made as will remain within the spiral of the invention and the scope of what is claimed.

Having thus described the invention what is claimed is:—

In a drill holding attachment for chucks, a substantially disk-shaped carrier having means whereby the same may be secured to a chuck and having oppositely located grooves opening out through the periphery thereof thereby dividing the carrier into two semi-circular sections, said disk-shaped carrier being formed with a hub projecting from one side thereof and an axially extending peripheral flange extending in the same direction and cooperating with the hub in rigidly joining the sections at the inner and outer portions thereof, jaws in said grooves, an annular adjusting plate rotatably mounted on said hub and having interlocking engagement with said jaws, said adjusting plate being provided with an annular groove receiving said flange, and a fastening plate secured to said hub and being in overlapping relation to said adjusting plate.

BLANCHE H. WILLIAMS.